P. CATUCCI.
FISHING REEL.
APPLICATION FILED FEB. 29, 1912.

1,095,624.

Patented May 5, 1914.

2 SHEETS—SHEET 1.

Witnesses:
Louis Sanders Jr
Gertrude L. Smith

Pliny Catucci Inventor
By Louis M. Sanders Attorney

P. CATUCCI.
FISHING REEL.
APPLICATION FILED FEB. 29, 1912.

1,095,624.

Patented May 5, 1914.

2 SHEETS—SHEET 2.

Witnesses:
Louis Sanders
Gertrude L. Smith

Pliny Catucci Inventor
By Attorney
Louis M. Sanders

UNITED STATES PATENT OFFICE.

PLINY CATUCCI, OF NEWARK, NEW JERSEY, ASSIGNOR TO A. F. MEISSELBACH & BRO., OF NEWARK, NEW JERSEY, A CORPORATION OF NEW JERSEY.

FISHING-REEL.

1,095,624.  Specification of Letters Patent.  Patented May 5, 1914.

Application filed February 29, 1912. Serial No. 680,698.

*To all whom it may concern:*

Be it known that I, PLINY CATUCCI, a citizen of the United States, and a resident of the city of Newark, county of Essex, and State of New Jersey, have invented certain new and useful Improvements in Fishing-Reels, of which the following is a specification.

My invention relates to that class of fishing reels known in the art as surf reels, and is designed for use in angling for fish of considerable size although the devices hereinafter described are applicable to fishing reels of any type. It is therefore necessary that the parts should be made with considerable strength and have means for freeing the spool from the winding mechanism, so that said spool may rotate freely and without material friction, at times when the line is being cast. Additional features, such as the usual click drag and friction drag are also provided. The principal feature however, of my invention resides in the mechanism of throwing the driving gear into and out of mesh with the spool pinion, so that the spool may revolve freely in its bearings when the line is being cast, and yet permit such mechanism to be instantly operated to throw the driving gear and spool pinion instantly into mesh.

I have engrafted the principal features of my invention upon the structures illustrated in prior patents granted to me, which structures are now in common use and well known in the art.

Figure 1:
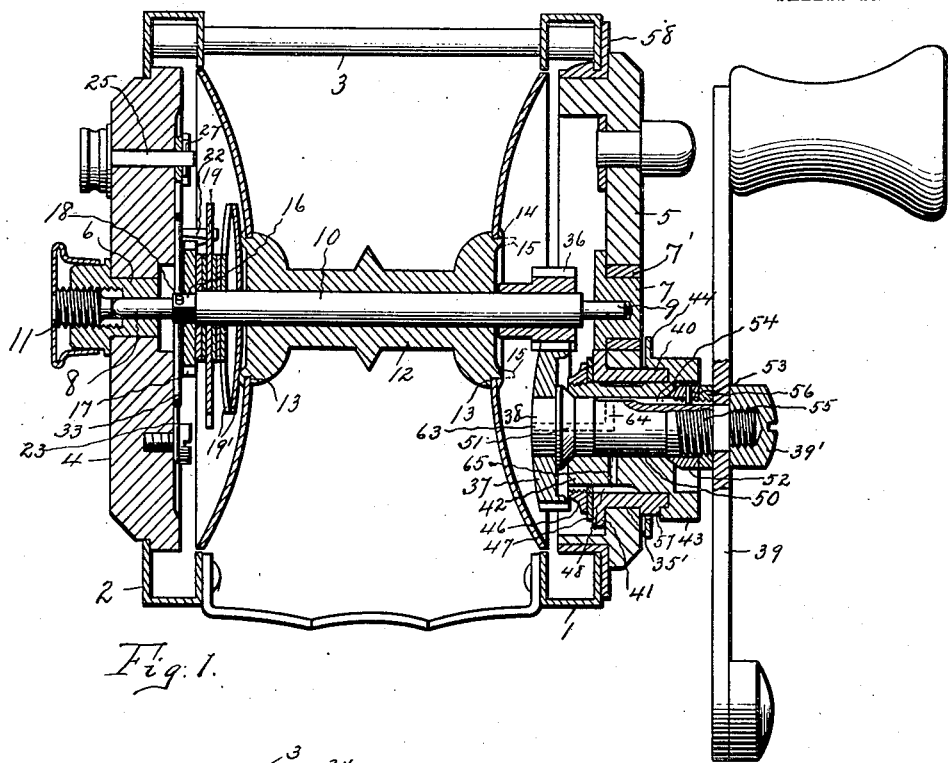
Figures 2, 3, 9:
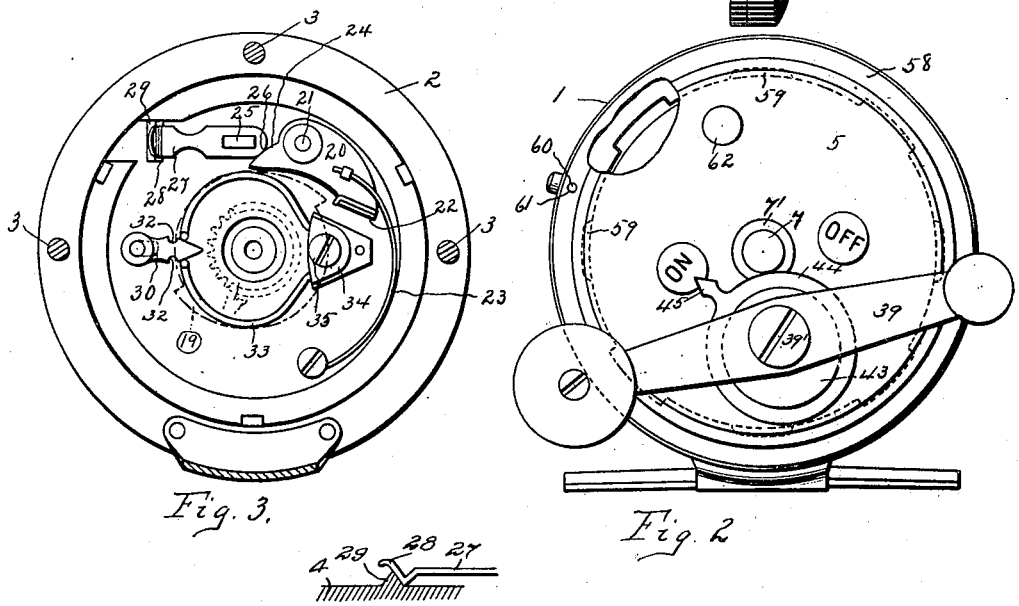
Figure 4:
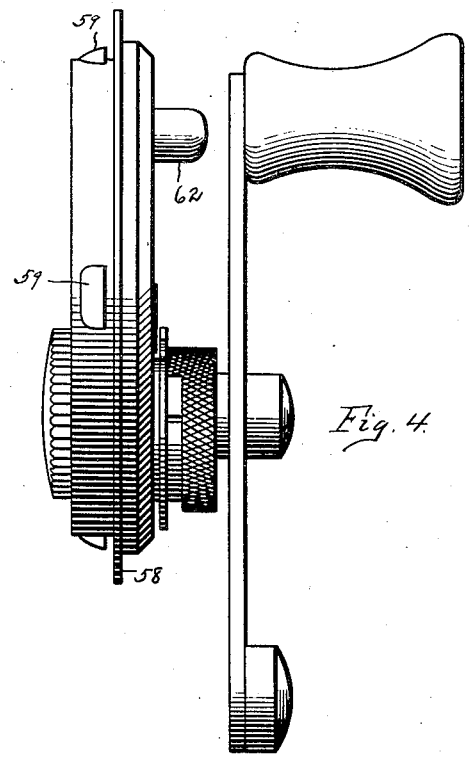
Figure 5:
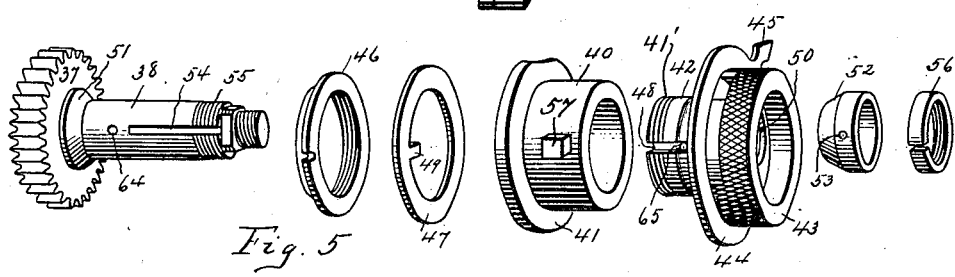
Figure 6:
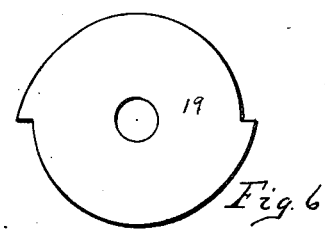
Figure 7:
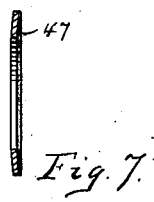
Figure 8:
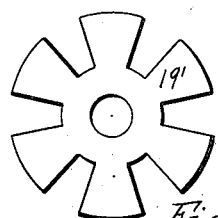

In the accompanying drawings forming a part of this specification, Figure 1 illustrates an enlarged sectional view of my invention. Fig. 2 illustrates an end view of the reel showing the external gear shifting parts. Fig. 3 illustrates an inside view of the back head plate illustrating particularly the click drag and the friction drag. Fig. 4 illustrates a side elevation of the front head plate detached from the frame. Fig. 5 illustrates in series the parts which make up the gear shifting mechanism. Fig. 6 illustrates in plan the friction disk forming a part of the friction drag. Fig. 7 illustrates in section the cambered spring washer. Fig. 8 is a plan of one of the star spring disks. Fig. 9 is a cross section of the head plate and operating slide.

Similar reference numerals refer to like parts throughout the specification and drawings.

The reel frame consists of the head rings 1 and 2, which are of general annular channel shape and connected together by means of the spacing studs 3. The back head plate 4 may be secured in the back head ring 2, in any convenient or desired manner as for example, by the means illustrated in my prior Patent No. 1,016,913, dated Feb. 6, 1912. The front head plate 5 may be secured in the front head ring in substantially the same manner as illustrated in the same patent or in any other convenient manner as may be desired.

Centrally secured in each of the head plates 4 and 5 are the pivot bearings 6 and 7 respectively, to receive the journals 8 and 9 of the spool spindle 10. The bearing 7 is removably secured in the head plate 5, by means of a bushing 7', the latter being very firmly set into a central aperture in the head 5. I also provide the adjusting thrust bearing 11 for preventing the end play of the spool spindle. Rigidly mounted upon the spool spindle 10 is the spool body 12. The ends of this spool body are enlarged as shown and provided with the shoulders 13 and the small extensions 14, which are originally left projecting outward, as shown in dotted lines at 15, so that the spool flanges may be slipped over the same and up to the shoulders 13 and thereafter the projections 15 are spun down or riveted over the apertured spool flanges, so that as completed, the spool is as illustrated in Fig. 1.

The spindle 11 is shown as squared at 16 to receive the click wheel 17 said click wheel being held in position by means of the small cotter pin 18. Between the click wheel 17 and the end of the spool head, I locate the friction drag mechanism. This consists, first of a pair of spring star wheels 19', the arms of which are cambered in such a manner that their extreme peripheries are in contact, the inner star wheel bearing directly against the spool head. Between the outer star wheel and the click 17 I locate the friction drag disk 19, said friction drag disk being provided with a pair of ratchet teeth diametrically disposed upon its periphery. Between the friction drag disk and the click wheel on the one side and between said drag disk and the star wheel on the other side, I locate respectively series of friction disks. This structure is such that when the spring disks, friction disks, friction drag wheel and click wheel are pressed down upon the protruding end of the spindle with the cotter pin inserted outside of the click wheel, a very considerable friction is offered to the rotation of the friction drag disk around the end of the spindle. As a means for operating this drag mechanism, I locate in the back head plate a spring pressed pawl 20, said pawl consisting of a flat piece of metal pivoted at 21 upon the back head plate, having an upturned end 22 for engagement with the teeth on the friction drag disk. The spring 23 has one end secured to the pawl and the other end on the inside of the back head plate as shown, so that the tendency of the spring is to maintain the upturned end of the pawl in position for engagement with the ratchet teeth of the drag disk. Means must also be employed for throwing this pawl into and out of engagement. For this purpose, I provide the pawl with an extension at the rear of this pivot, such extension forming a sort of cam 24. Adjacent to the location of this cam, I provide an operating slide, said slide consisting of a sliding push pin 25, extending from the outside of the back head plate and having at its inner end a cam 26, and a spring tail piece 27. This spring tail piece is bent into V shape as at 28, so that it may slide over from one side to the other of the V shaped projection 29 formed on the inside of the back head plate. This cam piece is located in such position that when slid in one direction it will engage the cam or extension 24 on the pawl 20 and throw it out of the path of the teeth on the drag disk. In this position the spring tail piece with its V shaped bent end will rest upon one side of the projection 29. When slid in the opposite direction, the cam will pass out of engagement of the cam on the spring pawl and the V shaped tail piece will snap over the projection 29 and thus be carried out of engagement with the cam on the spring pawl. This will permit the spring 23 to throw the pawl back into position for engagement with the teeth on the drag disk. The sliding push pin is provided with a button on the outside for hand manipulation.

For operating the click drag in connection with the click wheel 17, I provide the usual sliding click 30 in the back head plate, said click having an external button by which it can be pushed out from or in toward the center of the head plate. This click has the usual arrow point for engagement with the teeth of the click wheel when in its inner position. The click is also provided with a pair of notches, 32, 32, one on each side, as shown, for engagement with the click spring 33. The latter consists of a wire bent up into the form shown in Fig. 3, and located around the click wheel with its upturned ends in position to bear upon each side of the arrow point of the click or in the said notches, 32, 32 according to the position in which said click is located. The click spring is provided with a loop by which it is held in place under the spring cap 34 and screw 35. It will thus be seen that no matter in which direction the spool is rotated, if the click is pushed in it will exert a spring drag upon the rotation of the spool and if the friction drag pawl is released, a considerable friction drag may be applied to the spool to prevent the free running out of the line, as when playing a fish.

The mechanism thus far described differs but slightly and only in minor details from the corresponding structures described in my prior patents, but inasmuch as it helps make up the complete reel in its improved form, I have thought it best to describe it in detail.

The spool spindle 10 is provided with the usual pinion 36 rigidly fixed thereto for engagement with the driving gear 37, the latter rigidly mounted upon the gear shaft 38 which is mounted in bearings in the front head plate. The usual crank 39 is secured to the outer end of the shaft 38 by means of the nut 39'. It will be readily seen that by the rotation of the shaft 38, when the gear 37 is in mesh with the pinion 36, the spool may be rotated to wind in the line. As above indicated, there are many times when it is desirable to completely free the spool from any coöperating parts which might serve to retard its free rotation.

I have already described the means by which the friction drag and the click drag may be thrown into and out of operation, so as to permit the spool to revolve freely, so far as the connections with the back head plate are concerned. It now remains to describe the mechanism whereby the driving gear and the pinion are separated from each other, so that there will be no frictional drag whatsoever upon the free running of the spool and the consequent free paying out of the line, except of course such friction as may develop in the pivot bearings for the spool spindle. The front head plate, as shown in Fig. 1, is made of vulcanized rubber, fiber, metal or other suitable material and it has an aperture 35' of considerable size running directly through it. In this aperture is the permanently fixed bushing bearing 40, said bushing having the inner flange 41 resting against the inner face of the head plate. Within this bearing, I locate the bearing shaft 42, said bearing shaft being nicely fitted within the aperture of the bushing 40. The outer end of the bearing shaft 42 is provided with a cap 43 either integral with the shaft 42 or such cap may be a separate piece and permanently secured to shaft. This cap overhangs the outer end of the bushing 40 as shown, and is provided with a flange 44 which latter has an extension or pointer 45 integral therewith. The inner end of the bearing shaft 42 is screw threaded as at 41' to receive the nut 46, beneath which I locate the spring washer 47. Running longitudinally of the shaft 42 as at 48 I provide a slot to receive the inwardly projecting tongue 49 of the spring washer 47, so that said spring washer must rotate in frictional engagement with the flange 41 of the bushing 40. By providing this spring washer I also obviate the tendency of the nut 46 to unscrew as the bearing shaft 42 is rotated from side to side. Passing eccentrically through this bearing shaft 42 is the bearing aperture 50 to receive the gear shaft 38 and in order to form suitable bearings for said shaft, I provide thereon the cone 51 at the one end adjacent to the gear wheel 37 and at the other end an adjustable cone 52, the latter being provided with a pin 53 which extends into the longitudinal slot 54 in the side of the shaft 38, so as to prevent any relative rotation of the cone 52 with respect to the shaft 38. The outer end of the shaft 38 is screw threaded as at 55 to receive the spring nut 56. Both ends of the bearing aperture 50 are coned to form bearings for coöperation with the two cones 51 and 52. It will thus be seen that a substantially rigid bearing is provided in the head plate in which the gear shaft 38 may freely rotate and also that proper provision is made to take up for the wear of the parts.

The eccentricity of the aperture 50 with respect to the bearing shaft 42 is such that when the axes of the spool spindle 10, the bearing shaft 42 and the gear shaft 38 lie in the same plane, the gear 37 will be in mesh with the pinion 36. If however, the angler desires to free such connection, he does so by rotating the cap 43 through an angle of a little more than 90 degrees which, carrying with it as it does, the bearing shaft 42 and the eccentrically located shaft 38, will carry the gear 37 completely free from the pinion 36 and thus permit the spool to revolve freely without hindrance from the described parts. In order to limit the rotation of the cap 43 so as to prevent undue rotation of the bearing shaft 42 in one direction or the other, I provide a projection 57 upon the side of the bushing 40 and outside of the head plate. In the cap 43 and flange 44, I provide a corresponding slot for coöperation with this projection 57, said slot being considerably larger than the width of the projection 57, so that the cap 43 may be rotated within the bearing bushing 42 back and forth through an angle of more than 90 degrees. This, I find to be ample for throwing the gears into and out of mesh.

On the outside of the head plate and in position for coöperation with the index pointer 45, I locate two significant marks or "spots" to indicate the limits of the throw of the eccentric. These "spots" in practice I mark as "On" and "Off" to indicate, in the one position, that the gears are in mesh, and in the other position, that they are out of mesh. The location of the cap 43 just beneath the crank 39 is of material advantage to the fisherman for the reason that in practice, the right hand is usually upon the crank and whenever desired, he may slip his hand from the handle of the crank to the eccentric cap 43 giving it a slight turn in one direction or the other as the case may be, to throw the gears into or out of engagement. This he may do instantly as when casting and throw the index pointer 45 to the "off" position, when the line will pay out freely with no drag upon it whatsoever. After the bait has struck, he may then reverse the eccentric and throw the gears 37 and 36 into mesh when the reel will be ready for winding in at any instant; the operator may then throw in any or both of the friction drags and thus be able to play the fish at will.

The front head plate is shown in the drawings as secured in the front head ring by the mechanism disclosed in my above named Patent, No. 1,016,913. The head plate consists of the recessed circular block of rubber or other suitable material which is provided with the flanged metal ring 58 at its periphery, said flanged ring also being provided with a series of circumferential projections 59 which are inserted through corresponding notches in the head ring, after which the head plate with its flanged ring is given a short twist when the locking pin 60 will snap into the aperture 61 provided therefor. In this way the head plate is firmly locked to the head ring and when all the parts are assembled the work of separating them takes but an instant. In order to facilitate the slight angular rotation of the front head plate to release the same from the head ring, I provide a rigid projecting button 62, so as to give the operator sufficient leverage by which he may slightly rotate the head plate in the head ring after the locking pin has been released.

The rotational friction of the bearing shaft 42 within the bushing 40 may be readily regulated through the nut 46 and the spring washer 47. In practice I find it desirable to screw up this nut 46 fairly tight so as to compress the spring washer 47, (which originally is slightly cambered) so as to draw the cap 43 into quite close frictional engagement with the outer end of the bushing 40. This frictional engagement between the shaft 42 and the bushing 40 should be sufficiently rigid to hold the parts in position either on or off and yet permit the comparative free shifting from one position to the other.

All of the parts of the structure become immediately accessible by removing the front head plate as above described. After the front head plate has been removed the spool may be removed from the remaining part of the frame for cleaning or oiling or for any other purpose. The liability of the parts and disarrangement or injury or unnecessary wear has been reduced to a minimum and yet the construction has been kept, within reasonable limits, very simple.

As a means for oiling the parts without changing the adjustment in order to make the bearings more accessible, I provide the gear shaft 38 with a central oil hole 63, drilling the same axially therein and then tapping said hole from the side of the shaft as at 64. In this way oil will pass to the two cone bearings 51 and 52, and through the oil hole 65 in the slot 48, whence it will lubricate the bearing parts between the said bearing shaft 42 and the bushing 40. Thus oil will pass to all of the parts in the shifting mechanism from the single outside hole 63.

I claim,

1. In a fishing reel, the combination of a reel frame, head plates mounted in said frame, a spool and spindle rotatably mounted in said head plates, a bushing bearing mounted in one of said head plates, a bearing shaft rotatably mounted in said bushing bearing, said bearing shaft having an aperture therethrough, said aperture lying parallel with but eccentric to the axis of said shaft, a cap upon one end of said bearing shaft for frictional engagement with said bushing bearing, an adjustable friction device upon the other end of said shaft for engagement with said bushing bearing, a driving shaft mounted in said aperture, gear connections between said driving shaft and said spool spindle and means for rotating said bearing shaft to connect and disconnect said gear connections.

2. In a fishing reel, the combination of a reel frame, head plates mounted in said frame, a spool and spindle rotatably mounted in said head plates, a bushing bearing mounted in one of said head plates, a bearing shaft rotatably mounted in said bushing bearing, an elastic friction device connected with said bearing shaft and bearing upon the end of said bushing bearing for preventing the free rotation of said shaft in said head plate, a driving shaft rotatably and eccentrically mounted in said bearing shaft, gear connections between said driving shaft and said spool spindle, means for rotating said bearing shaft in one direction or the other to engage or disengage said gear connections.

3. In a fishing reel, the combination of a reel frame, head plates mounted in said frame, a spool and spindle rotatably mounted in said head plates, a bushing bearing rigidly mounted in one of said head plates, a cylindrical bearing shaft rotatably mounted in said bushing bearing, said bearing shaft having an aperture lying parallel with and eccentric to the axis of said bearing shaft, a driving shaft mounted in said aperture, devices connected to said bearing shaft for frictional engagement with each end of said bushing bearing, means for adjusting one of said devices whereby the friction between said parts may be varied, gear connections between said driving shaft and spool spindle and means for rotating said bearing shaft to connect and disconnect said gear connections.

4. In a fishing reel, the combination of a reel frame, head plates mounted in said frame, a spool and spindle rotatably mounted in said head plates, a bushing bearing rigidly mounted in one of said head plates, a cylindrical bearing shaft rotatably mounted in said bushing bearing, said bearing shaft having an aperture lying parallel with and eccentric to the axis of said bearing shaft, a driving shaft mounted in said aperture, a spring washer connected to said bearing shaft for frictional engagement with the end of said bushing bearing, means for adjusting said spring washer whereby the friction between said parts may be varied, gear connections between said driving shaft and the spool spindle, means for rotating said bearing shaft to connect and disconnect said gear connections, and means for limiting the rotation of said cylindrical bearing shaft.

5. In a fishing reel, the combination of a reel frame, head plates mounted in said frame, a spool spindle rotatably mounted in said head plates, a bushing bearing mounted in one of said head plates, said bushing bearing being provided upon one end with a flange and the opposite end projecting outside of the head plate, a cylindrical bearing shaft rotatably mounted in said bushing bearing, said bearing shaft having upon its outer end an overhanging cap for frictional engagement with the outer end of said bushing bearing, a spring washer mounted upon the inner end of said bearing shaft in frictional engagement with the flange of said bushing bearing, a means for adjusting the pressure of said spring washer upon said flange, a driving shaft eccentrically mounted in said bearing shaft, gear connections between said driving shaft and said spool spindle and means for rotating said bearing shaft to connect and disconnect said gear connections.

6. In a fishing reel, the combination of a reel frame, head plates mounted in said frame, a spool spindle rotatably mounted in said head plates, a bushing bearing in one of said head plates, said bushing bearing being provided upon one end with a flange and the opposite end projecting outside of the head plate, a cylindrical bearing shaft rotatably mounted in said bushing bearing, said bearing shaft having upon its outer end an overhanging cap for frictional engagement with the outer end of said bushing bearing, a spring washer mounted upon the inner end of said bearing shaft in frictional engagement with the flange of said bushing bearing, a nut screwed upon the end of said bearing shaft for adjusting the pressure of said spring washer upon said flange, a driving shaft eccentrically mounted in said bearing shaft, gear connections between said driving shaft and said spool spindle, means for rotating said bearing shaft to connect and disconnect said gear connections and means for limiting the rotation of said cylindrical bearing shaft.

7. In a fishing reel, the combination of a reel frame, head plates mounted in said frame, a spool and spindle rotatably mounted in said head plates, a bushing bearing mounted in one of said head plates, a bearing shaft rotatably mounted in said bushing bearing, said bearing shaft having an aperture therethrough, said aperture lying parallel with but eccentric to the axis of said shaft, a cap upon one end of said bearing shaft for frictional engagement with said bushing bearing, a spring washer adjustably secured upon the other end of said shaft for engagement with said bushing bearing, a driving shaft mounted in said aperture, gear connections between said driving shaft and said spool and spindle, means for rotating said bearing shaft to connect and disconnect said gear connections, and indexing mechanism upon said bearing shaft and head plate for indicating the position of said bearing shaft.

8. In a fishing reel, the combination of a reel frame, head plates mounted in said frame, a spool and spindle rotatably mounted in said frame, a bushing bearing mounted in one of said head plates, a bearing shaft rotatably mounted in said bushing bearing, a spring washer connected with said bearing shaft and bearing upon the end of said bushing bearing for preventing the free rotation of said shaft in said head plate, a driving shaft rotatably and eccentrically mounted in said bearing shaft, gear connections between said driving shaft and said spool spindle, means for rotating said bearing shaft in one direction or the other to engage or disengage said gear connections, and indexing mechanism upon bearing shaft and head plate for indicating the position of said bearing shaft.

In testimony whereof I have hereunto set my hand this February, 1912.

PLINY CATUCCI.

Witnesses:
 NORMAN E. ZUSI,
 LOUIS M. SANDERS.